United States Patent [19]

Noguchi

[11] Patent Number: 4,965,565
[45] Date of Patent: Oct. 23, 1990

[54] LIQUID CRYSTAL DISPLAY PANEL HAVING A THIN-FILM TRANSISTOR ARRAY FOR DISPLAYING A HIGH QUALITY PICTURE

[75] Inventor: Kesao Noguchi, Tokyo, Japan

[73] Assignee: NEC Corporation, Tokyo, Japan

[21] Appl. No.: 190,799

[22] Filed: May 6, 1988

[51] Int. Cl.$^5$ .............................................. G09G 3/00
[52] U.S. Cl. ................................. 340/784; 340/718; 340/719; 350/333; 350/336
[58] Field of Search ............... 340/701, 702, 703, 718, 340/719, 784; 350/333, 356; 357/4, 23.7

[56] References Cited

U.S. PATENT DOCUMENTS

| | | | |
|---|---|---|---|
| 4,368,523 | 1/1983 | Kawate | 350/333 |
| 4,597,001 | 6/1986 | Bortscheller et al. | 357/23.7 |
| 4,600,274 | 7/1986 | Morozumi | 350/333 |
| 4,639,087 | 1/1987 | Cannella | 350/336 |
| 4,642,619 | 2/1987 | Togashi | 340/784 |
| 4,644,338 | 2/1987 | Aoki et al. | 340/784 |
| 4,666,252 | 5/1987 | Yaniv et al. | 350/333 |
| 4,678,282 | 7/1987 | Yaniv et al. | 350/333 |
| 4,704,002 | 11/1987 | Kikuchi et al. | 357/4 |
| 4,704,559 | 11/1987 | Suginoya et al. | 340/784 |
| 4,728,172 | 3/1988 | Cannella | 350/333 |
| 4,745,406 | 5/1988 | Hayashi et al. | 340/703 |
| 4,762,398 | 8/1988 | Yasui et al. | 357/23.7 |
| 4,773,737 | 9/1988 | Yokono et al. | 350/333 |
| 4,775,861 | 10/1988 | Saito | 350/333 |
| 4,789,223 | 12/1988 | Kasahara et al. | 340/784 |
| 4,790,630 | 12/1988 | Maurice | 340/784 |
| 4,792,210 | 12/1988 | Maurice | 340/784 |
| 4,804,953 | 2/1989 | Castleberry | 340/784 |
| 4,819,038 | 4/1989 | Alt | 357/23.7 |
| 4,834,507 | 5/1989 | Kato et al. | 357/23.7 |

Primary Examiner—Alvin E. Oberley
Assistant Examiner—Richard Hjerpe
Attorney, Agent, or Firm—Helfgott & Karas

[57] ABSTRACT

An LCD panel includes a plurality of pixel electrodes disposed on an insulating substrate in rows and columns, and a plurality of drain buses and gate buses formed is a space between the pixel electrodes, the drain buses having portions operating as a drain electrode, the gate buses having branches operating as a gate electrode and each of the pixel electrodes having a side portion to form a thin-film transistor with the portion of the drain buses and the branch of the gate buses, the positions of the side portions of the pixel electrodes in the rows being changed in adjacent pixel electrodes and repeated in the rows and the positions of the pixel electrodes in the columns being changed in adjacent pixel electrodes and repeated in the columns.

9 Claims, 1 Drawing Sheet

LIQUID CRYSTAL DISPLAY PANEL HAVING A THIN-FILM TRANSISTOR ARRAY FOR DISPLAYING A HIGH QUALITY PICTURE

BACKGROUND OF THE INVENTION

1. Field of the Invention

This invention relates to a liquid crystal display panel, and more particularly to an arrangement of thin-film transistors suitable for being used in a liquid crystal display device for displaying a picture free from non-uniformity in a manufacturing process.

2. Description of the Related Arts

In the liquid crystal display (referred to LCD) panel, a thin-film transistor array is used for switching the liquid crystal in each pixel element. The thin-film transistors in the array have been increased in number and miniaturized, as the displaying area in the LCD panel has been widened. The high-integration and the miniaturization require severe preciseness in manufacturing process. A small deviation in the manufacturing process affects the quality of an imaged picture. Especially, in a color LCD panel, the degradation of the imaged picture quality is remarkable.

More specifically, a plurality of drain buses and a plurality of gate buses are orthogonally crossed on a glass substrate to form a mesh. Each pixel electrodes is formed on an area enclosed in the mesh. The pixel elctrodes operate as source electrodes of the thin-film transistors. The gate buses have branches extending along a predetermined side portion of the pixel electrodes. The drain buses have protrusions facing the predetermined side portion of the pixel electrode through the branches of gate buses. The branches of gate buses are separated from the pixel electrodes and the protrusions of drain buses through amorphous silicon film, thereby forming thin-film transistors with a drain electrode of the protrusion, a gate of the branch and the source of the predetermined side portion.

In such thin-film transistor array of the prior art, however, all the transistors are formed uniformly. The position and direction of the drain, the gate and the source are the same in all pixel electrodes. Therefore, a deviation of etching mask alignment varies stray capacitances between gate and drain electrodes and between gate and source electrodes. This variation in stray capacitances causes a change in brightness between all LCD panels. Moreover, since the LCD pixels are driven by a voltage having alternate polarities, the drain and source electrodes change their function with the alternation of the driving voltage polarity. This means that the brightness of the imaged picture changes with the alternation of the voltage polarity resulting in a flicker of a picture. In a color LCD device, this flicker causes a periodical color difference which, in turn, causes a remarkable degradation of color picture quality. Furthermore, in the LCD device for TV picture, each pixel electrode are driven by two thin-film transistors formed on opposite sides of the pixel electrodes and driven by two successive scanning periods. The deviation of the etching mask causes a difference of in the stray capacitances of the two thin-film transistors and results in a change in brightness in the two scanning periods. This brightness change also degrates the color picture quality.

In order to prevent the variation of the stray capacitances, U.S. Pat. No. 4,597,001 proposed to widen the gate electrode so that the positions of the drain and source electrodes may move on the gate electrode. This measurement makes each thin-film transistor large and associates with enlarged stray capacitances.

SUMMARY OF THE INVENTION

It is, therefore, a primaly object of the present invention to provide an LCD panel having a thin-film transistor array improved for displaying a picture free from deviation in a manufacturing process.

According to the present invention, an LCD panel includes a plurality of pixel electrodes disposed on an insulating substrate in rows and columns, and a plurality of drain buses and gate buses formed in spaces between the pixel electrodes, the drain buses having portions each operating as a drain electrode, the gate buses having branches each operating as a gate electrode and each of the pixel electrodes having a side portion to form a thin-film transistor with the respective portion of the drain buses and the respective branch of the gate buses, the positions of the side portions of the pixel electrodes in the rows being changed in adjacent pixel electrodes and repeated in the rows, and the positions of the pixel electrodes in the columns being changed in adjacent pixel electrodes and repeated in the columns.

Since the positions of the thin-film transistors are repeatedly changed in the rows and the columns, the effect of the deviation of the etching mask alignment varies in thin-film transistors depending on their positions in pixel electrodes. Therefore, the changed brightness of the pixels is distributed all over the imaged picture to provide that the imaged picture is felt natural. Since the changed pixel brightnesses is not form a line, the flicker in the imaged picture does not produced. In other words, the picture quality in different manufactured products does not vary.

BRIEF DESCRIPTION OF THE DRAWINGS

The above and other objects, features and advantages of the present invention will become more apparent from the following description taken in conjunction with the accompanying drawings, wherein.

DESCRIPTION OF THE PREFERRED EMBODIMENTS

Figure 1:
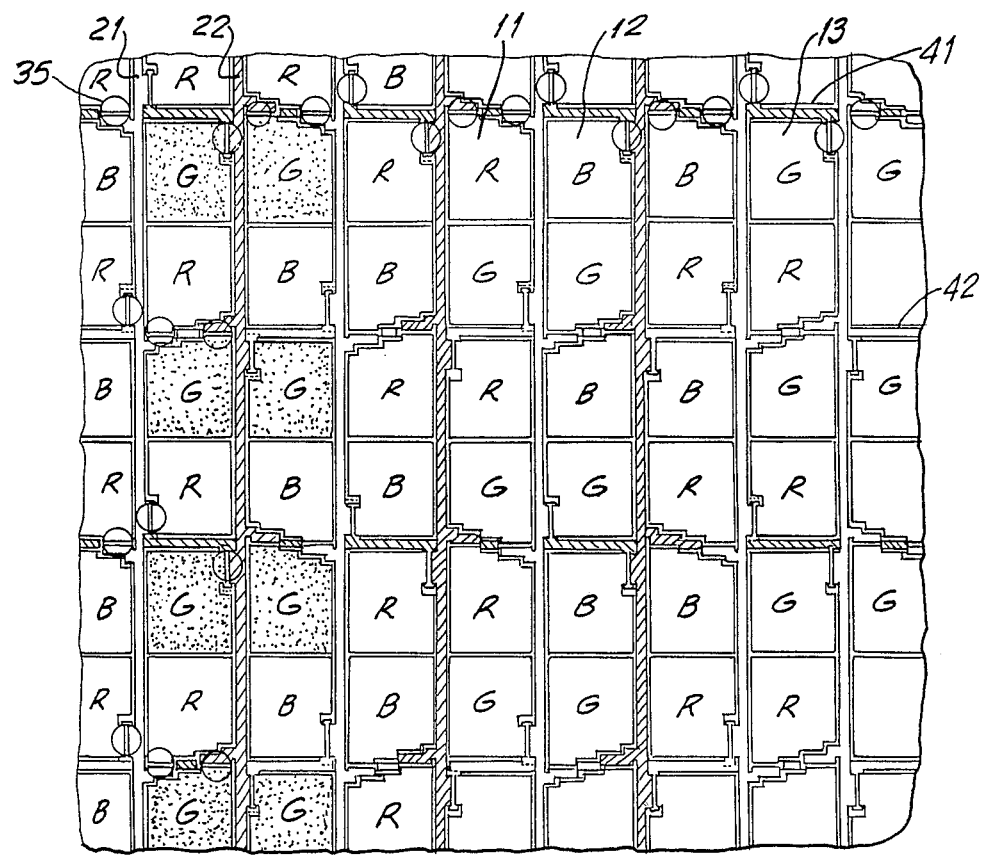
FIG. 1 is a partial plan view of a thin-film transistor array according to a first embodiment of the present invention.

FIG. 1 shows a part of a thin-film transistor array for a color LCD panel. On a glass substrate, pixel electrodes 11, 12 and 13 are formed in a matrix form. The pixel electrodes 11 are covered with red filter to produce red pixels. Similarly, the pixel electrodes 12 are covered with blue filter to produce blue pixels. The pixel electrodes 13 are covered with green filter to produce green pixels. In rows, two red pixel electrodes 11, two blue pixel electrodes 12 and two green pixel electrodes 13 are arranged in this order to repeat this order. In adjacent rows this order is displaced with a half pitch of the order. Drain buses 21 and 22 run along the columns in spaces between the pixel electrodes. Gate buses 41 and 42 run along the rows in spaces between the pixel electrodes which are located in every two rows of the pixel electrodes. The drain buses 21 have a protrusion and a branch at every one of crossing points with the gate buses 41 and 42, but the positions of the protrusions and the branches are repeatedly changed at every one of the crossing points. The drain buses 22 similarly have the protrusion and the branch at every crossing point with the gate buses 41 and 42 but their directions are opposed to those of the drain buses 21. The gate buses 41 and 42 have two branches at all crossing points with the drain buses 21 and 22 to extend between the pixel electrodes and the protrusions of the drain buses and between the pixel electrodes and the branches of the drain buses. The branches of the gate buses 41 and 42 are covered with amorphous silicon on which the protrusions and branches of the drain electrodes 21 and 22 overlay to form thin-film transistors. The positions of the thin-film transistors are marked in FIG. 1 by circles 35. Thus formed thin-film transistor array is covered with an orientation board, a layer of liquid crystal, another orientation board, a common electrode board and a color filter in this order, to form an LCD panel.

The thin-film transistor array shown in FIG. 1 has the transistors at different positions of the pixel electrodes. The positions of the transistors in the second row are repeated at the left portion of the upper side and the upper portion of the right side. Those in the third row are repeated at the lower portion of the right side and the left portion of the lower side. Those in the fourth row are repeated at the upper portion of the left side and the right portion of the upper side. Similarly, those in the fifth row are repeated at the right portion of the lower side and the lower portion of the left side. Thus, in the rows, the positions of the transistors in the pixel electrodes are alternatively changed with two different positions. In columns, those are repeated with four different positions. Therefore, if the etching mask alignment is displaced in a direction of rows, its effect on stray capacitances of the transistors is opposite to the transistors formed at the left side and the right side of the pixel electrodes. If the displacement of the etching mask alignment occurs in a direction of the columns, its effect on stray capacitances is opposite to the transistors formed at the upper side and the lower side.

In a TV display, each pixel electrode is driven for such short time that all stray capacitances at the pixel electrode may not be changed in a saturated condition. The variation of the stray capacitances affect on charged voltage. Then, the capacitance variation changes the brightness of each pixel. However, the thin-film transistor array of the first above-described embodiment does not produce uniform change in the stray capacitance in the same rows or the same columns, but distributes the change in the stray capacitance over the thin-film transistor array. Therefore, the change in the pixel brightness is distributed over the transistor array to make its effect unremarkable or to feel that the imaged picture is natural. Furthermore, since the change in the pixel brightness is distributed over the transistor array, the flicker is not produced in the imaged picture. Especially, in this first embodiment, there are transistors having opposite effects on the stray capacitances. By the displacement of the etching mask alignment, while one of the transistors lowers the pixel brightness, the other transistor increases the pixel brightness, resulted in cancellation of the change in the pixel brightness in the whole imaged picture. Thus, a natural picture can be reproduced irrespective of the displacement of the etching mask alignment.

Figure 2:
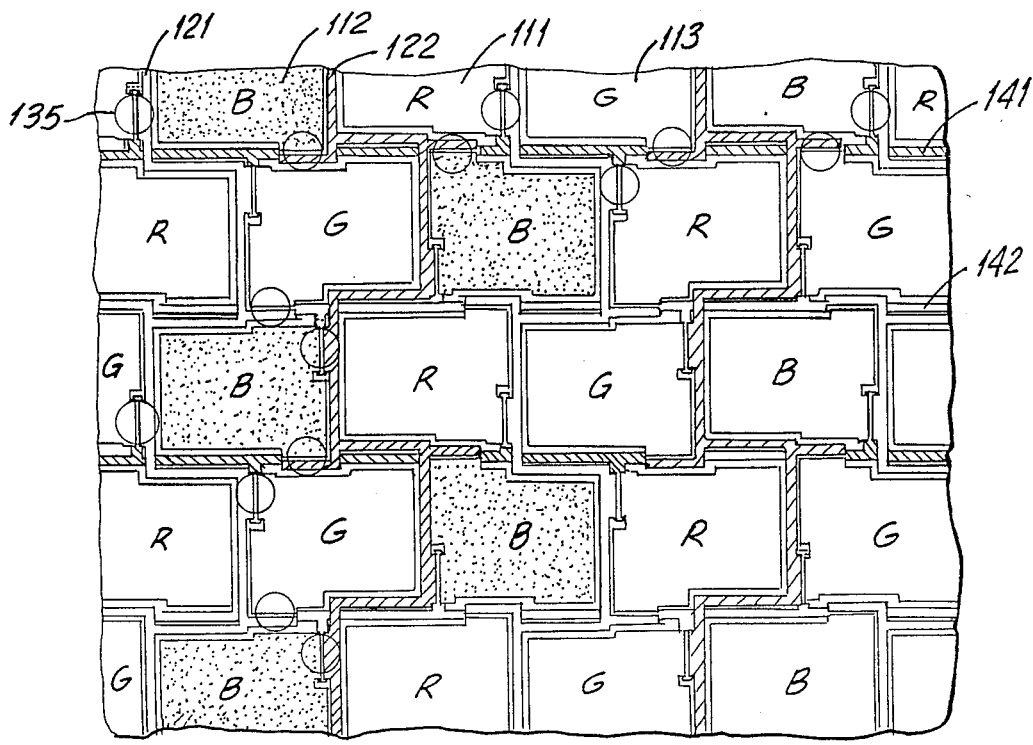
FIG. 2 is a partial plan view of a thin-film transistor array according to a second embodiment of the present invention.

FIG. 2 is a thin-film transistor array according to the second preferred embodiment of the present invention, and has a triangular pixel arrangement. The thin-film transistor array has a plurality of pixel electrodes 111, 112 and 113 which respectively reproduce red, blue and green pixels with a covered filter. In all rows, the pixel electrodes 112, 111 and 113 for blue, red and green are repeated in this order but in adjacent rows, the order being displaced with a pitch of one and a half pixel electrodes. Gate buses 141 and 142 run along the direction of rows in spaces between the pixel electrodes. The gate buses 141 and 142 have branches extending along the sides of the upper and lower pixel electrodes. Drain buses 121 and 122 run in the direction having a right angle with the rows between the pixel electrodes. The drain buses 121 and 122 and the pixel electrodes 111, 112 and 113 overlay the gate buses 141 and 142 through amorphous silicon to form thin-film transistors shown by circles 135. Two of the thin-film transistors are associated with each one pixel electrode.

In the lower portion of the first row of the pixel electrodes, the thin-film transistors are repeatedly formed at the lower portion of the right side and the right portion of the lower side. In the upper portion of the second row, the transistors are repeatedly formed at upper portion of the left side and the left portion of the upper side. In the lower portion of the second row, the transistors are repeatedly formed at the left portion of the lower side and the lower portion of the left side. In the upper portion of third row, the transistors are repeatedly formed at the upper portion of the right side and the right portion of the upper side. In this way, the transistors are repeatedly formed on lower side, the upper side, right side and left side in this order along the gate bus 141, and on the upper side, lower side right side and left side in this order along the gate bus 142. The transistors are also repeatedly formed on right side, left side, lower portion and upper side in this order along the drain bus 121 and the left side, right side, lower side and upper side in this order along the drain bus 122. In both of orthogonal directions, the repetition of the transistor positions is made at every fourth one of the thin-film transistors.

In the second embodiment, the effect of the displacement of the mask alignment on the stray capacitances is varied in the two orthogonal directions of the pixel electrodes, similarly to the first embodiment shown in FIG. 1. The change in the pixel brightness distributes over the thin-film transistor array to make the imaged picture feel natural. The flicker is also not produced in the imaged picture. The imaged picture quality in not varied in product by product. Furthermore, since each pixel electrode is driven by two adjacent gate buses, an open circuit in one gate bus is compensated for by the other gate bus to prevent the transistor array from failure. Moreover, in driving by the interlacing scanning, since one pixel electrode is driven for double scanning periods, there is no flicker in the picture.

As clearly seen from FIGS. 1 and 2, thin-film transistors designated at 35 and 135, respectively, are formed between the gate regions, source regions and drain regions. The transistors extend in the array along each of the gate buses and each of the drain buses, respectively. The directions of the gate branch regions of the thin-film transistors which are formed along each of the gate buses are repeatedly changed from one orthogonal direction to the other orthogonal direction and vice versa and such changes are repeated with every first predetermined number transistor of the film transistors formed along each of the gate buses. The directions of the branch gate regions of the thin-film transistors which are formed along each of the drain buses are repeatedly changed from one orthogonal direction to the other of the orthogonal directions and vice versa; and changes are repeated with every second predetermined number transistor of the thin-film transistors formed along each of the drain buses.

As mentioned above, the thin-film transistor array for an LCD panel according to the present invention can reproduce a natural picture irrespective of the displacement of the etching mask alignment. Therefore, any preciseness of the mask alignment is not required in a manufacturing process, resulted in easiness in manufacture, lowering in cost and high production yield.

What is claimed is:

1. A thin-film transistor array for a liquid crystal display panel comprising:
    an insulating substrate;
    a plurality of pixel electrodes formed on said insulating substrate in two orthogonal directions, said pixel electrodes having source regions;
    a plurality of drain buses formed on said insulating substrate between said pixel electrodes in one of said orthogonal directions, each of said drain buses having a plurality of drain regions;
    a plurality of gate buses formed on said insulating substrate between said pixel electrodes in the other of said orthogonal directions, each of said gate buses having a plurality of branch gate regions; and
    a plurality of semiconductor films formed between said gate regions, said source regions and said drain regions to form therewith a plurality of thin-film transistors, of which some transistors extend along each of said gate buses and some transistors extend along each of said drain buses,
    wherein directions of the branch gate regions of the thin-film transistors which are formed along each of said gate buses are repeatedly changed from said one of said orthogonal directions to the other of said orthogonal directions and vice versa and changes being repeated with every first predetermined number of the film transistors formed along said each of said gate buses, and wherein directions of the branch gate regions of the thin-film transistors which are formed along each of said drain buses are repeatedly changed from said one of said orthogonal directions to the other of said orthogonal directions and vice versa and changes being repeated with every second predetermined number of the thin film transistors which are formed along each of said drain buses.

2. A thin-film transistor array for a liquid crystal display panel as claimed in claim 1, wherein said pixel electrodes are formed in a matrix form having rows and columns, said one of said orthogonal directions being a column direction, and the other of said orthogonal directions being a row direction.

3. A thin-film transistor array for a liquid crystal display panel as claimed in claim 2, wherein each of said pixel electrodes has one of said thin-film transistors therein, said first predetermined number being two, and said second predetermined number being four.

4. A thin-film transistor array for a liquid crystal display panel as claimed in claim 3, wherein each of said pixel electrodes has a square form having four sides, said one of said thin-film transistors in each pixel electrode being formed along one of said four sides of said pixel electrode, said one of said four sides having the same direction as said branch gate region of said thin-film transistor.

5. A thin-film transistor array for a liquid crystal display panel as claimed in claim 1, wherein said pixel electrodes are disposed in a line in the other of said orthogonal directions and form a repetition group of said pixel electrodes for producing a red pixel, a blue pixel and a green pixel, the repetition groups provided in adjacent lines in the other of said orthogonal directions having a displacement of a half pitch of said repetition.

6. A thin-film transistor array for a liquid crystal display panel as claimed in claim 5, wherein each of said pixel electrodes has two said thin-film transistors therein.

7. A thin-film transistor array for a liquid crystal display panel as claimed in claim 6, wherein said two thin-film transistors formed in each of said pixel electrodes are driven by different gate buses.

8. A thin-film transistor array for a liquid crystal display panel as claimed in claim 6, wherein the branch gate region of one of said two thin-film transistors extends in said one of said orthogonal directions, the branch gate region of the other of said two thin-film transistors extending in the other of said orthogonal directions.

9. A thin-film transistor array for a liquid crystal display panel as claimed in claim 7, wherein the branch gate region of one of said two thin-film transistors extends in said one of said orthogonal directions, said branch gate region of the other of said two thin-film transistors extends in the other of said orthogonal directions.

* * * * *

UNITED STATES PATENT AND TRADEMARK OFFICE
CERTIFICATE OF CORRECTION

PATENT NO. : 4,965,565
DATED : October 23, 1990
INVENTOR(S) : Kesao Noguchi

It is certified that error appears in the above-identified patent and that said Letters Patent is hereby corrected as shown below:

On the title page below item [22] Filed: May 6, 1988, insert

--[30] Foreign Application Priority Data
  May 6, 1987 [JP]  Japan ... 62-111334--.

Signed and Sealed this

Third Day of March, 1992

Attest:

HARRY F. MANBECK, JR.

*Attesting Officer*  *Commissioner of Patents and Trademarks*